United States Patent [19]

Brooks

[11] 4,215,081
[45] Jul. 29, 1980

[54] LIQUID AERATOR

[76] Inventor: Kirtland H. Brooks, 1082 Laurel Dr., Lafayette, Calif. 94549

[21] Appl. No.: 6,008

[22] Filed: Jan. 24, 1979

[51] Int. Cl.² ............................................. B01D 47/02
[52] U.S. Cl. ..................................... 261/122; 261/77; 366/101; 366/163; 366/165
[58] Field of Search ....................... 366/101, 163, 165; 261/124, 122, 123, 77; 210/220; 55/255, 256

[56] References Cited

U.S. PATENT DOCUMENTS

| | | | |
|---|---|---|---|
| 3,228,526 | 1/1966 | Clabattari | 261/123 |
| 3,452,966 | 7/1969 | Smolski | 261/77 |
| 3,846,079 | 11/1974 | Alagy | 261/77 |
| 3,853,986 | 12/1974 | Blass | 261/122 |
| 3,910,826 | 10/1975 | Kataoka | 261/77 |

Primary Examiner—Robert W. Jenkins
Attorney, Agent, or Firm—Bruce & McCoy

[57] ABSTRACT

An apparatus for dissolving a gas such as air into a liquid utilizing a submerged tube provided with means for injecting the gas into the lower end thereof and for inletting liquid into the tube at various locations throughout the length thereof.

7 Claims, 4 Drawing Figures

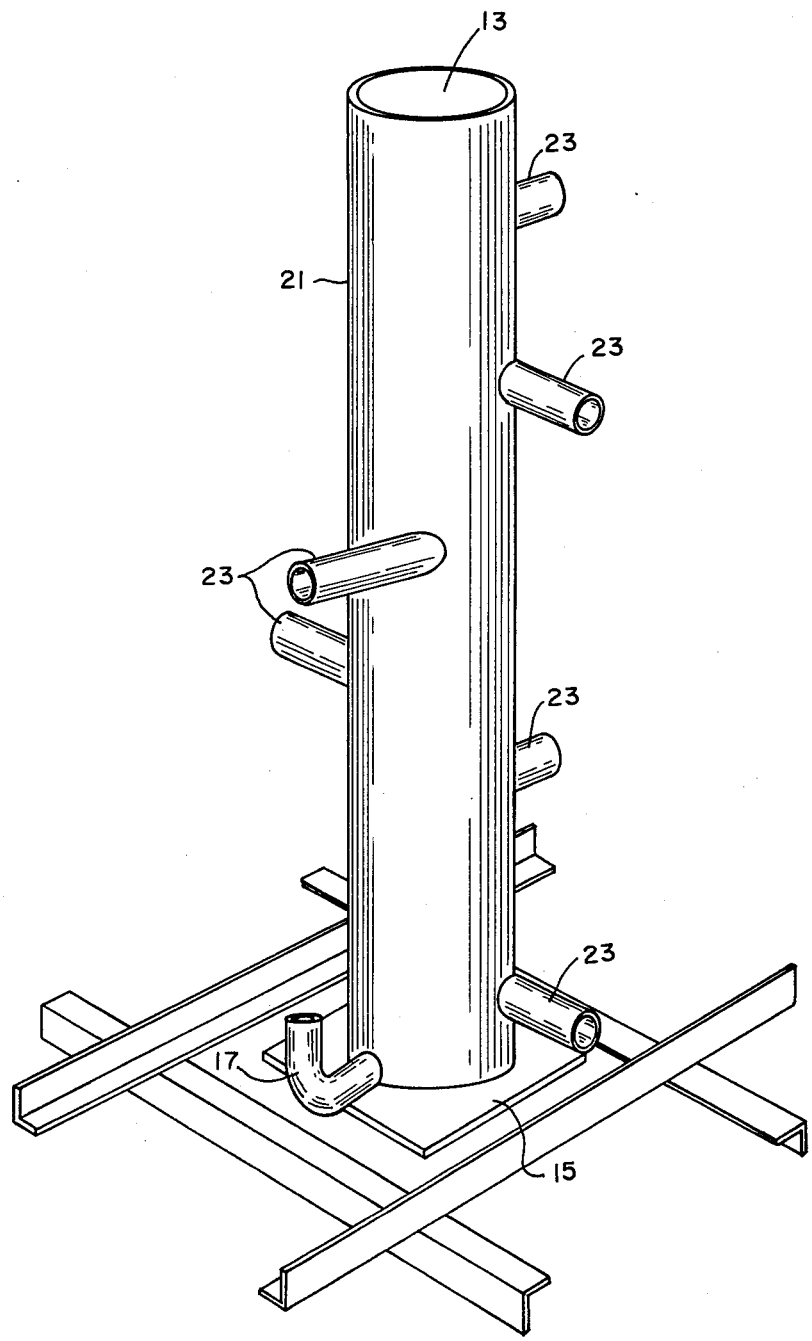
FIG.—1

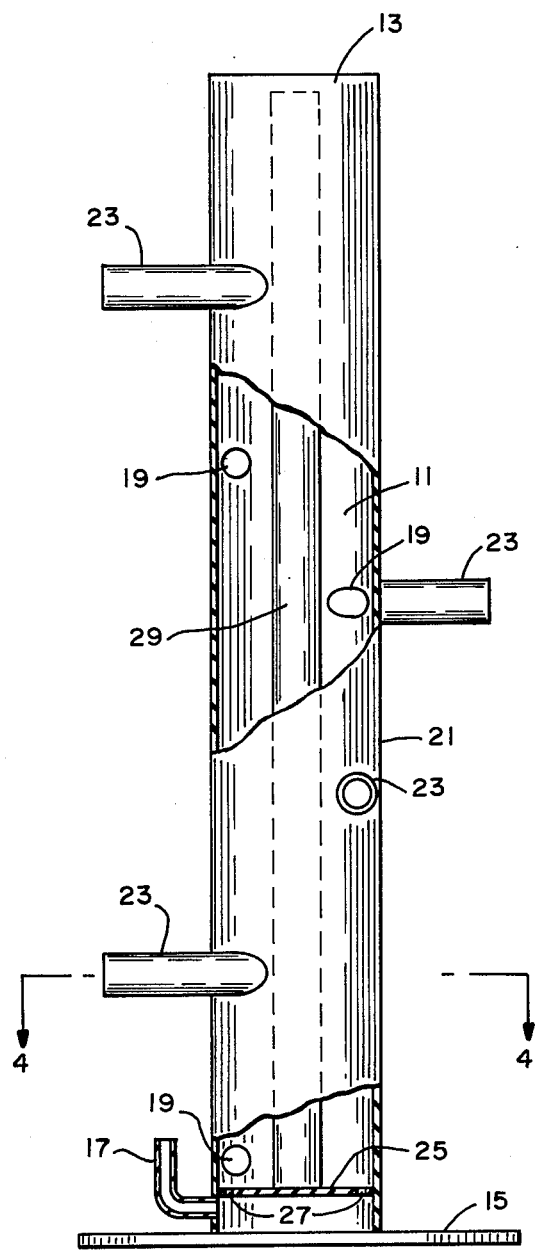
FIG.—2
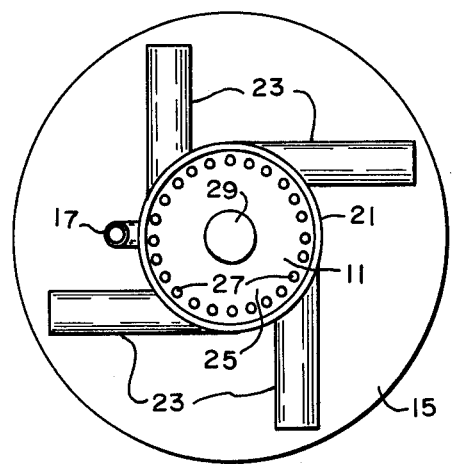
FIG.—3
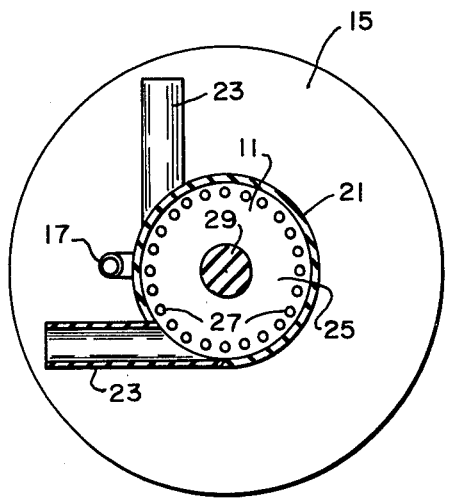
FIG.—4

LIQUID AERATOR

BACKGROUND OF THE INVENTION

1. FIELD OF THE INVENTION

The present invention relates to an apparatus for aerating liquids and more particularly to waste water treatment systems where large volumes of liquid must be aerated efficiently and with low energy consumption as a part of the waste water treatment process.

2. DESCRIPTION OF THE PRIOR ART

There are many types of devices for aerating liquids which are utilized in the waste water treatment industry. The main goal of such devices is to dissolve oxygen into the waste water to promote the biological activity necessary to decompose organic matter mixed in the waste water. To operate efficiently, such devices must be capable of aerating large volumes of waste water efficiently and with low energy consumption. The process of dissolving a gas in a liquid is basically a surface interaction phenomenon, and it has been found that more rapid dissolution of the gas is achieved by: utilizing smaller gas bubbles within the liquid to increase available surface area for dissolution; agitating the gas bubble-liquid mixture; and prolonging the length of time that the gas bubbles remain in contact with the liquid.

The prior art such as U.S. Pat. Nos. 3,452,966, issued to Smolski, 3,628,775, issued to McConnell, 721,036, issued to Gwynne and Sargeant, and 3,415,378, issued to Fukuda, all attempt to achieve some or all of these goals. The present invention is more effective than these prior devices in that it is easy to manufacture and maintain in operation as it has no moving parts, it provides the tiny gas bubbles necessary for maximum surface area for gas dissolution, it achieves rapid gas bubble-liquid mixture agitation, and it provides a prolonged gas bubble and liquid contact to increase the length of time of the gas bubble-liquid mixture interaction.

SUMMARY OF THE INVENTION

The present invention is an apparatus for aerating a liquid. It comprises a substantially cylindrically shaped tube which has an open upper end and is vertically submerged in the liquid to be aerated. Air or any other gas is injected through a gas inlet located at the lower end of the tube. As the gas rises through the liquid in the tube it aerates the liquid and causes the liquid to rise within the tube and be discharged out the upper end thereof. Non-aerated liquid is drawn into the tube through openings in the sidewalls thereof to replace the aerated liquid that has been discharged. The sidewall openings are formed to cause the gas bubble-liquid mixture to swirl as it rises within the tube thereby enhancing the aeration of the liquid by prolonging the period of contact between the rising gas bubbles and the liquid and causing greater agitation of the mixture.

OBJECTS OF THE INVENTION

It is therefore an important object of the present invention to provide an apparatus for dissolving a gas into a liquid.

It is another object of the present invention to provide an apparatus for the efficient aeration of large volumes of liquids as is required in the waste water treatment industry in that it requires relatively little energy input.

It is a further object of the present invention to provide an apparatus for the aeration of liquids that is inexpensive to manufacture and easy to maintain in operation.

It is yet another object of the present invention to provide an apparatus for the aeration of liquids that has no moving parts.

It is yet a further object of the present invention to provide an apparatus for the aeration of liquids which maximizes the surface area for gas-liquid interface to increase the efficiency of the aeration process.

It is still another object of the present invention to provide an apparatus for the aeration of liquid which agitates the gas bubble-liquid mixture to increase the efficiency of the aeration process.

And it is still a further object of the present invention to provide an apparatus for the aeration of liquids which prolongs the gas bubble rise through the liquid thereby increasing the length of time of the gas bubble-liquid interaction for more efficient aeration of the liquid.

Other objects of the present invention will become apparent from the description of the preferred embodiment of the invention when it is considered in conjunction with the accompanying drawings.

DESCRIPTION OF THE DRAWINGS

FIG. 1 is a perspective view of the LIQUID AERATOR of the present invention;

FIG. 2 is a side elevational view thereof;

FIG. 3 is a top plan view thereof; and

FIG. 4 is a sectional view taken along lines 4—4 of FIG. 2.

DESCRIPTION OF THE PREFERRED EMBODIMENT

The present invention is an apparatus for the dissolution of a gas in a liquid. It has particular application in the aerating of sewage in the waste water treatment industry wherein air is the gas utilized; it being understood that any gas can be utilized in differing applications of the device. The apparatus consists of a substantially cylindrically shaped tube 11 which is open at the top end 13 and is designed to be submerged in a vertical orientation in the liquid to be aerated. A heavy metal 15 plate may be attached to the bottom of the tube to aid in maintaining the submerged, vertical orientation when the apparatus rests on the bottom of the liquid reservoir. The bottom end of the tube may be open, however a closed bottom end has been found to reduce the likelihood of clogging of the apparatus. An air inlet orifice 17 is located proximate the lower end of the tube to allow air, or whatever other gas is to be dissolved in the liquid, to be injected into the tube. Liquid inlet ports 19 are provided in the sidewalls 21 of the tube to allow liquid to enter into the tube. When air is injected into the tube through the air inlet orifice 17, it breaks into bubbles and rises within the liquid in the tube thus aerating the liquid and causing it to also rise with the bubbles within the tube and be discharged out of the upper end of the tube. Non-aerated liquid is continuously drawn into the tube through the liquid intake ports 19 to replace the discharged liquid.

A liquid intake tube 23 is utilized to enclose each liquid intake port formed in the sidewall of the tube. Each liquid intake tube 23 is formed to protrude from the sidewall at an angle that is tangential to the sidewall at its point of attachment. By virtue of the tangential orientation of the liquid intake tubes, liquid is drawn into the tube at an angle that is substantially tangential to the sidewall of the tube and creates a spiraling flow of liquid plus air bubbles within the tube. The length of the liquid intake tube relative to its diameter must be long enough to assure that the liquid passing therethrough is flowing in the same substantially tangential direction as the central axis of the liquid intake tube. A liquid intake tube inner diameter that is approximately 33% of the liquid intake tubes greatest length has been found to be adequate. Also the inner diameter of the liquid intake tube should be approximately 25% of the main tube inner diameter. These proportions have been found to be adequate for a device having an overall length of approximately 40 inches and in inner diameter of approximately 6 inches but may vary somewhat for devices of substantially larger or smaller dimensions.

In the preferred embodiment of the present invention a diffuser plate 25 is placed within the tube at the bottom end thereof directly above the air inlet orifice. The diffuser plate 25 is flat and has small holes 27 located around its periphery to allow the injected air to pass therethrough. It breaks up the injected air into bubbles that are far smaller than can be obtained by simply injecting air into the bottom of the tube utilizing the air inlet orifice. The creation of small air bubbles greatly increases the surface area per volume measure of air available for air-liquid interface and thus increases the efficiency with which the air dissolves into the liquid. The holes 27 of the diffuser plate 25 may be subjected to clogging by materials suspended in the liquid. To reduce the liklihood of clogging, the lower end of the cylindrical tube may be closed thus preventing the possibility of liquid and suspended materials from being drawn through the diffuser plate holes and clogging them.

To cause an even greater break up of the air bubbles, the bottom-most liquid intake port is located directly above the diffuser plate. The incoming liquid from this bottom-most liquid intake port is directed to flow across the stream of air bubbles as they emanate from the holes of the diffuser plate thus creating a shearing effect which severs the emanating bubbles into a still smaller size.

Other liquid intake ports and their associated liquid intake tubes are located in an ascending spiral within the sidewall of the tube. This configuration tends to promote the continued spiraling of the air bubble-liquid mixture as it rises in the tube by the introduction of tangentially inflowing water at graduated intervals along the length of the tube.

In operation, air, or any other desired gas, is injected at the lower end of the submerged device. Tiny bubbles of air emanate through the diffuser plate and into the liquid in the tube. As the air bubbles rise within the liquid in the tube, they aerate the liquid and also cause the liquid to rise through the tube until the air bubble-liquid mixture is discharged through the open top of the tube. Non-aerated liquid continuously enters the tube through the liquid intake ports to replace the discharged air bubble-liquid mixture.

By virtue of the tangential orientation of the liquid intake tubes, the incoming liquid enters in a direction that is substantially tangential to the sidewall of the tube thus causing the air bubble-liquid mixture within the tube to swirl. The result is a rising maelstrom of liquid and air bubbles which agitates the air bubble-liquid mixture and delays the rise of the bubbles through the liquid. This increases the length of time that the air bubbles are in contact with the liquid and causes more efficient aeration of the liquid per volume of air.

In operating the first prototypes of the device, it was found that the swirling of the air bubble-liquid mixture in the tube caused some of the air bubbles to coalesce along the vertical central axis of the swirling mixture, and the swirling flow about the central axis interfered with itself by flowing in opposite directions at the axis of the swirling flow. To prevent these effects from occuring, a vertical cylindrical deflector baffle 29 is disposed along the vertical central axis of the tube. As a result, the air bubble-liquid mixture swirls around the deflector baffle without the coalescence of air bubbles along the central axis and without interference from oppositely flowing portions of the swirling mixture. A deflector baffle whose outer diameter is approximately 33% of the inner diameter of the tube has been found to be adequate.

The device may be submerged to any desired depth and can even be utilized with the top end proximate or slightly above the surface of the liquid. However, as the top end approaches or extends above the liquid surface, the discharge of aerated liquid from the top of the device becomes impeded by surface and gravitational constraints on the free flow of the liquid. This results in a back pressure that lowers the efficiency of the device until a point is reached at which the discharge of liquid stops and the air just bubbles up through the tube.

In some installations, the air pump that is being utilized to inject air into the air inlet 17 may be too weak to develop sufficient pressure to pump air to a depth proximate the bottom of the pond where the air inlet 17 is located. To overcome this problem without the installation of a more powerful pump, the device my be placed on a raised platform to raise it to a shallower depth whereby the existing pump can deliver sufficient air to operate the device. However, this raised platform solution has significant drawbacks in that the bottom of the pond is left undisturbed by water flow into the device resulting in organic matter within the wastewater settling out at the bottom of the pond. the raised platforms would also increase the expense of installation of a system of the devices. To overcome these drawbacks, the device can remain at the bottom of the pond, the air inlet 17 can be relocated to a point in the sidewall of the device that is high enough that the air pump pressure is sufficient to inject air into this new raised air inlet. An air bubble diffuser, formed as an annular ring along the inner sidewall of the tube and enclosing the raised air inlet, can be utilized to break up the inletted air into small bubbles. When the raised air inlet is utilized liquid will still enter the device through all of the liquid inlet tubes, but the spiraling liquid below the raised air inlet will not contain air bubbles. This configuration will generally be less efficient as a shorter length of the tube's mixing chamber is utilized and thus the length of time of air bubble-liquid contact is reduced. However, liquid flow into the device will occur at the bottom of the pond to inhibit the settling of organic matter.

From the foregoing description of the present invention it can be seen that the entire action of the invention is effected by the interaction of the gas and liquid elements with each other as the invention possesses no moving parts to cause this interaction. It is the novel configuration of the tangential orientation of the liquid intake tubes that causes the gas and liquid elements to agitate and swirl with no mechanical aid save the sidewall constraint on the swirling flow. The lack of moving parts is a very important feature which reduces the cost of manufacture and provides a simple device having little liklihood of breakdown. No prior art known to the inventor teaches such a simple yet effective technique for liquid aeration.

Although the present invention has been described in considerable detail, it is not intended that the invention be limited to such detail except as necessitated by the appended claims.

I claim:

1. An apparatus for aerating a liquid comprising
   a tube having an open upper end and submerged substantially vertically in said liquid and filled therewith,
   a gas inlet to permit the injection of gas proximate the bottom end of said tube whereby gas bubbles emanating from said gas inlet mix with and rise through said liquid within said tube and cause said liquid therein to also rise through said tube and be discharged out of the upper end thereof, and
   means to allow liquid to be continuously drawn into said tube through the sidewall thereof, said means being formed to cause the indrawn liquid to swirl around inside said tube as it mixes with the rising gas bubbles whereby the gas bubble-liquid mixture swirls as it rises through the tube thereby enhancing the aeration of the liquid by prolonging the period of contact between the rising gas bubbles and the liquid and causing greater agitation of the mixture.

2. The apparatus according to claim 1 wherein a diffuser plate is disposed above said gas inlet to break up the inletted gas into smaller bubbles to promote greater surface contact of the gas with the liquid per volume measure of inletted gas.

3. The apparatus according to claim 1 wherein said liquid intake means includes at least one port which is provided with a liquid intake tube formed to cause said inletted liquid to flow into said tube in a direction that is substantially tangential to the sidewall thereof.

4. The apparatus according to claim 3 wherein a plurality of liquid intake ports are located relative to said sidewall in a rising spiral pattern to reinforce the swirl of the gas bubble-liquid mixture as it ascends through the tube.

5. The apparatus according to claim 4 wherein
   a cylindrical deflector baffle is disposed along the vertical central axis of said tube to restrict the rising gas bubble-liquid mixture in said tube in a spiraling path displaced from the central axis of said tube.

6. The apparatus according to claim 4 wherein
   said air inlet proximate the lower end of said tube is relocated to a point that is higher in the sidewall of said tube to inject air at a point higher in said tube.

7. An apparatus for aerating a liquid comprising
   a hollow cylinder submerged substantially vertically in the liquid and filled therewith, said cylinder being open at the upper end thereof for the discharge of aerated liquid therethrough and closed at the lower end thereof,
   an air inlet to permit the injection of air proximate the lower end of said cylinder,
   a diffuser plate disposed in said cylinder above said air inlet to break up the inletted air into smaller sized air bubbles to increase the amount of surface contact of the air with the liquid per volume measure of inletted air,
   a plurality of liquid intake ports disposed in the sidewall of said cylinder, each of said ports being funnelled by a liquid intake tube arranged to continuously allow water to be drawn into said cylinder substantially tangentially to said sidewall at the point of attachment of said liquid intake tube to said sidewall whereby as said injected air rises through said liquid within said cylinder it mixes with said liquid and aerates it and causes the mixture of air bubbles and liquid to rise through said cylinder and be discharged through the upper end of said cylinder, said discharged liquid being replaced by liquid which continuously flows into said cylinder through said liquid intake tubes in a tangential direction to cause a swirling flow within said cylinder, said liquid intake tubes being arranged in a rising spiral pattern to reinforce the swirl of the air bubble-liquid mixture as it rises through said cylinder thereby enhancing the aeration of the liquid by slowing the ascent of the mixture to prolong the period of contact of the liquid with the air and causing greater agitation of the mixture, the lowest of said liquid intake tubes being disposed immediately above said diffuser plate to cause the inletted liquid therefrom to shear the emanating air bubbles into even a smaller size than created by the diffuser plate, and
   a cylindrical deflector baffle disposed along the vertical central axis of said cylinder to restrict the rising air bubble-liquid mixture in said cylinder in a spiraling path displaced from the central axis of said cylinder.

* * * * *